United States Patent
Haeuser et al.

(10) Patent No.: US 9,602,512 B2
(45) Date of Patent: Mar. 21, 2017

(54) METHODS AND APPARATUS TO DISTRIBUTE MEDIA DELIVERY TO MOBILE DEVICES

(75) Inventors: Tony Haeuser, Aurora, IL (US); Mary McCarthy, San Antonio, TX (US); Scott Pettit, San Antonio, TX (US); Chris Lee, San Antonio, TX (US); Roland Noll, San Antonio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 527 days.

(21) Appl. No.: 11/382,188

(22) Filed: May 8, 2006

(65) Prior Publication Data

US 2007/0260604 A1    Nov. 8, 2007

(51) Int. Cl.
| | |
|---|---|
| *H04N 21/258* | (2011.01) |
| *H04L 29/06* | (2006.01) |
| *H04N 7/173* | (2011.01) |
| *H04N 21/2347* | (2011.01) |
| *H04N 21/414* | (2011.01) |
| *H04N 21/426* | (2011.01) |
| *H04N 21/472* | (2011.01) |
| *H04N 21/658* | (2011.01) |

(52) U.S. Cl.
CPC .......... *H04L 63/10* (2013.01); *H04L 63/107* (2013.01); *H04N 7/17318* (2013.01); *H04N 21/2347* (2013.01); *H04N 21/25841* (2013.01); *H04N 21/41407* (2013.01); *H04N 21/42684* (2013.01); *H04N 21/47202* (2013.01); *H04N 21/6582* (2013.01); *H04L 63/0428* (2013.01); *H04L 63/083* (2013.01); *H04L 2463/101* (2013.01)

(58) Field of Classification Search
CPC . G06F 17/30849; H04L 63/10; H04L 63/107; H04N 7/17318; H04N 21/2347; H04N 21/25841; H04N 21/41407; H04N 21/42684; H04N 21/47202
USPC .......................................... 707/769, 610, 640
See application file for complete search history.

(56) References Cited

U.S. PATENT DOCUMENTS

| | | | |
|---|---|---|---|
| 5,003,384 A * | 3/1991 | Durden ................ | G06Q 20/145 348/E7.063 |
| 5,880,769 A | 3/1999 | Nemirofsky et al. | |
| 5,990,927 A | 11/1999 | Hendricks et al. | |
| 6,557,173 B1 | 4/2003 | Hendricks | |
| 6,674,448 B1 | 1/2004 | Garahi et al. | |
| 6,760,916 B2 | 7/2004 | Holtz et al. | |
| 6,760,918 B2 | 7/2004 | Rodriguez et al. | |

(Continued)

OTHER PUBLICATIONS

"Cisco Broadband Termination Unit User Guide" by Cisco Systems, Inc., 2001.*

(Continued)

*Primary Examiner* — Marc Somers
(74) *Attorney, Agent, or Firm* — Hanley, Flight & Zimmerman, LLC

(57) ABSTRACT

Methods and apparatus to distribute media content are disclosed. An example method includes receiving a request for media content from a mobile device, determining an identity of at least one of the mobile device or a consumer using the mobile device, comparing the identity to subscription records associated with the distribution of media content to a geographically fixed consumer location; and based on the comparison, determining if the mobile device is authorized to receive the media content.

22 Claims, 5 Drawing Sheets

(56) References Cited

U.S. PATENT DOCUMENTS

| | | | |
|---|---|---|---|
| 6,873,853 | B2 | 3/2005 | Kim |
| 6,950,624 | B2 | 9/2005 | Kim et al. |
| 6,968,568 | B1 | 11/2005 | Hilpert, Jr. et al. |
| 7,350,231 | B2 * | 3/2008 | Madison et al. .............. 726/10 |
| 2001/0039663 | A1 | 11/2001 | Sibley |
| 2001/0051996 | A1 * | 12/2001 | Cooper et al. .............. 709/217 |
| 2002/0069419 | A1 | 6/2002 | Raverdy et al. |
| 2004/0031058 | A1 | 2/2004 | Reisman |
| 2004/0049567 | A1 * | 3/2004 | Manchin .............. G06F 21/88 709/223 |
| 2004/0203712 | A1 | 10/2004 | Murai et al. |
| 2004/0267880 | A1 * | 12/2004 | Patiejunas .............. H04L 29/06 709/203 |
| 2005/0033850 | A1 * | 2/2005 | Kirkland .......... H04L 29/06027 709/228 |
| 2005/0246758 | A1 | 11/2005 | Khandelwal et al. |
| 2005/0273833 | A1 | 12/2005 | Soinio |
| 2005/0283791 | A1 | 12/2005 | McCarthy et al. |
| 2005/0288101 | A1 | 12/2005 | Lockton et al. |
| 2005/0289604 | A1 | 12/2005 | Byers |
| 2006/0009258 | A1 | 1/2006 | Narita et al. |
| 2006/0195548 | A1 * | 8/2006 | Hunter ................. G06Q 20/123 709/217 |
| 2006/0259927 | A1 * | 11/2006 | Acharya ............ H04N 7/17318 725/61 |
| 2007/0107016 | A1 * | 5/2007 | Angel et al. ................... 725/61 |
| 2007/0111717 | A1 * | 5/2007 | Mueller .............. H04N 5/44543 455/418 |
| 2007/0118648 | A1 * | 5/2007 | Millefiorini et al. ......... 709/225 |
| 2007/0121584 | A1 * | 5/2007 | Qiu et al. ...................... 370/352 |
| 2007/0217436 | A1 * | 9/2007 | Markley et al. .............. 370/401 |
| 2007/0239825 | A1 * | 10/2007 | Walter .......................... 709/204 |

OTHER PUBLICATIONS

International Search Report mailed on Jul. 7, 2008, in corresponding PCT Application Serial No. PCT/US07/06702, 3 pages.

Written Opinion mailed on Jul. 7, 2008, in corresponding PCT Application Serial No. PCT/US07/06702, 6 pages.

Canadian Intellectual Property Office, Office action, Canadian Application No. 2,645,723, 2 pages, mailed on Feb. 16, 2009.

"An Introduction to IPTV", http://arstechnica.com/guides/other/iptv.ars, downloaded on Mar. 14, 2006, 3 pp.

"Sling: About Sling Media", http://www.slingmedia.com/about/, downloaded on Mar. 9, 2006, 1 pp.

"Comcast. Press Room: Annoucement", http:www/cmcsk.com/phoenix.zhtml?c=14765&p=irol-announcement, downloaded on Mar. 9, 2006, 4 pp.

"Pervasive. TV: Placeshifiting: Remote Viewing of Home Media", http://in3.typepad.com/ptv/2005/01/placeshifiting_r.html., downloaded on Mar. 14, 2006, 1 pp.

"The Impact of Emerging Technologies: CBS Outfoxing Fox?", http://www.techreview.com/TR/wtr_16188,323,p1.html, downloaded on Feb. 17, 2006, 2 pp.

"MobiTV: MobiTV Press", http://www.mobitv.com/press/press.php?i=press/release_040506, downloaded on Apr. 7, 2006, 3 pp.

* cited by examiner

METHODS AND APPARATUS TO DISTRIBUTE MEDIA DELIVERY TO MOBILE DEVICES

FIELD OF THE DISCLOSURE

The present disclosure relates generally to media systems and, more particularly, to methods and apparatus to distribute media content.

BACKGROUND

Internet protocol television (IPTV) services provide television media content over a broadband network. In general, an IPTV provider receives media content from media content creators and distributes the media content to consumer locations. The IPTV provider then converts the media content into packetized digital media streams. The packetized digital media streams are distributed to consumer locations via an internet protocol (IP) multicast or an IP unicast. The consumer location includes a consumer device that receives the packetized digital media streams and converts the streams into media content suitable for display on a television. Because the consumer device communicates with the IPTV provider over an IP connection, the consumer device can easily transmit data back to the IPTV provider. In other words, the IPTV provider and the consumer device can engage in two-way communication.

As media content distribution technologies, like IPTV, have developed, the ability to integrate media content services has increased. In particular, media content creators have begun to provide media content to cellular telephone services for distribution to the subscribers of the cellular phone service.

DETAILED DESCRIPTION

Figure 1:
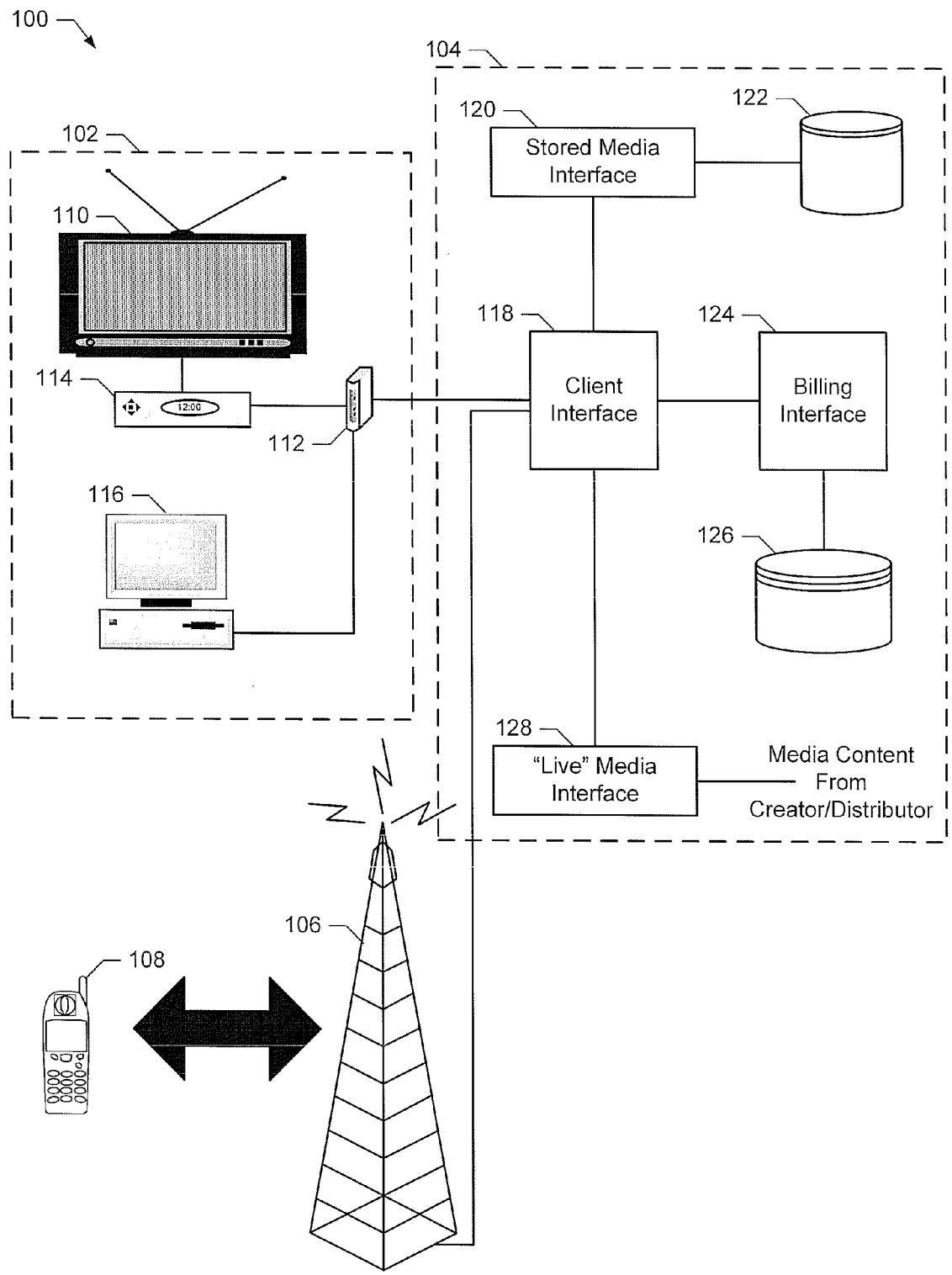
FIG. 1 is a block diagram of an example telecommunication system for distributing media.

An example telecommunication system 100 for distributing media content is illustrated in FIG. 1. The example methods and apparatus described herein may be used to distribute media content to a television connected to a media content receiver and to a mobile device (e.g., a device constructed to be carried by a person (e.g., in a pocket, purse, briefcase, on a belt-clip, etc.) during normal day-to-day activities such as a mobile phone, a Blackberry®, a personal digital assistant (PDA), a laptop computer, a desktop computer, a portable media presentation device, a gaming device, a personal media player, a two-way pager, a moving picture experts group (MPEG) layer three (MP3) player, etc.) In the example methods and apparatus, a telecommunication provider manages media content subscriptions for both the television media content receiver and the mobile device. For example, a media content consumer may subscribe to receive media content (e.g., the Home Box Office (HBO) channel) at the consumer's household. If the same consumer attempts to access the media content on a cellular phone, the subscription records associated with the household subscription are queried. After determining that the consumer has already subscribed to receive the media content at their household, the telecommunication system 100 will allow the media content to be presented on the cellular phone. For example, the media content may be the picture-in-picture portion of a media content program. The media content may be provided to the cellular phone with or without a fee in addition to the home subscription fee.

The example telecommunication system 100 of FIG. 1 includes a consumer location 102, a telecommunication network 104, a wireless telecommunication system 106, and a mobile device 108. The example telecommunication system 100 receives media content from media content distributors and/or creators and transmits the media content to the consumer location 102 and the mobile device 108.

The consumer location 102 may be any geographically fixed location where media content is presented. For example, the consumer location 102 may be a household, a business, etc. The example consumer location 102 comprises a television 110, a network terminal unit (NTU) 112, customer premise equipment (CPE) 114, and a personal computer (PC) 116.

Television 110 displays media content received from the CPE 114. The example television 110 may be any type of television such as, for example, a standard definition television, an enhanced definition television, a high-definition television, a cathode ray tube (CRT) television, a liquid crystal display (LCD) television, a plasma television, a projection television, an organic light emitting diode (OLED) television, a surface-conduction electron-emitter display (SED) television, etc. Alternatively, the television 110 may be any other device that is capable of receiving and presenting media content such as, for example, any type of radio receiver/player, a projector, a monitor, a computer, etc.

The NTU 112 communicatively couples the consumer location 102 with the telecommunication network 104. In the example telecommunication system 100, the NTU 112 receives internet protocol (IP) data from the telecommunication system 104 and transmits IP data to the telecommunication system 104. In the illustrated example, the NTU 112 receives IP television (IPTV) media content. The example NTU 112 transmits the IPTV media content to the CPE 114 and/or the computer 116, which are described in further detail below. In the example telecommunication system 100, the NTU 112 and the CPE 114 are discrete devices. However, persons of ordinary skill in the art will recognize that the NTU 112 and the CPE 114 may be integrated in a single device.

The example NTU 112 is an asynchronous digital subscriber line (ADSL) terminal unit-remote (ATU-R). Alternatively, the NTU 112 may be any other communications unit such as, for example, a cable modem, a satellite receiver, an optical network terminal unit (ONT), a symmetrical digital subscriber line (SDSL) terminal unit, an integrated services digital network (ISDN) terminal unit, a high bitrate digital subscriber line (HDSL) terminal unit, a very high bitrate digital subscriber line (VDSL) terminal unit, an asynchronous transfer mode (ATM) terminal unit, an Ethernet network card, a wireless network card (e.g., a wireless network card that operates according to any of the IEEE 802.11 protocols), a channel service unit (CSU), a data service unit (DSU), a modem, or any other type of communication device.

The example NTU 112 communicates with the CPE 114 and the computer 116 via an Ethernet connection. The NTU 112 may alternatively be connected to the CPE 114 and/or the computer 116 via a wireless network connection, a serial communications connection, a parallel communications connection, a universal serial bus (USB) connection, an IEEE 1394 (FireWire) connection, a high-definition multimedia interface (HDMI) connection, etc. While FIG. 1 illustrates the connections between the NTU 112 and the CPE 114 and the NTU 112 and the computer 116 as direct connections, the connections may alternatively include one or more of a hub, a router, a switch, a gateway, etc. For example, a router may be attached to the NTU 112 and each of the CPE 114 and the computer 116 (as well as any other device) may be connected to the router via a hardwire or wireless connection.

The CPE 114 selects media content received from the telecommunication network 104 and outputs the media content to the television 110. For example, a consumer may request (via a remote control) that the CPE 114 output the content currently presented by HBO. The CPE 114 will send a message (via the NTU 112) to the telecommunication network 104 requesting that the telecommunication network 104 send the HBO media content stream to the consumer location 102 or allow the CPE 114 to connect to the HBO media content stream. When the CPE 114 receives the HBO media content stream, the CPE 114 will output the HBO media content stream to the television 110. Alternatively, if the CPE 114 receives broadcast media content (e.g., a cable television broadcast), the CPE 114 will use tuning circuitry to extract the HBO media content from the broadcast media content and output the HBO media content to the television 110. The CPE 114 is sometimes referred to as a set-top-box (STB), a residential gateway (RG), a receiver, an integrated receiver/decoder (IRD), or a tuner. As previously described, the CPE 114 and the NTU 112 may be integrated in a single device. As an additional alternative, the CPE 114 may be integrated in the television 110 or the television 110 may include a card-slot for receiving a card that implements the CPE 114.

The computer 116 receives media content via the NTU 112 and executes software that causes media content to be presented on an available display and/or available audio presentation hardware. The computer 116 may additionally connect to networked data sources (e.g., a local computer network, the internet, etc.) via the NTU 112. The computer 116 may be a PC, a laptop computer, a notebook computer, a tablet PC, a hand-held computer, a home theatre PC (HTPC), etc. Alternatively, the computer 116 may be a PDA, a gaming device, a portable media presentation device, a portable media player, an MP3 player, mobile phone, etc. While the example computer 116 receives media content via the NTU 112, the computer 116 may additionally or alternatively receive media content via the CPE 114.

In some examples, a consumer may use the computer 116 to access a list of available media content. The consumer may access the list of available media content by visiting a webpage using web browsing software (e.g., Microsoft Internet Explorer®, Mozilla FireFox®, Netscape®, Opera™, etc.) installed on the computer 116. The webpage may or may not be provided over an encrypted or secure connection. The computer 116 may alternatively include dedicated software for requesting and presenting the list of available media content. Once the list of available media content is retrieved and presented, the consumer may select a media content program, stream or broadcast for presentation. The computer 116 requests the media content stream from the telecommunication network 104 via the NTU 114. The requested media content is presented to the consumer via the web browsing software or the dedicated software.

The telecommunication network 104 provides media content services and IP data services to the consumer location 102 and/or, via the wireless telecommunication system 106, to the mobile device 108. The example telecommunication network 104 provides IPTV media content services, but other media types might likewise be appropriate. The telecommunication network 104 comprises a client interface 118, a stored media interface 120, media storage 122, a billing interface 124, a billing storage 126, and a "live" media interface 128.

The client interface 118 is communicatively coupled to the NTU 114 and the wireless telecommunication system 106 to transmit data to and/or receive data from the NTU 114 and the wireless telecommunication system 106. The client interface 118 receives and/or retrieves media content from the media storage 122 via the stored media interface 120 and from the media content creators/distributors via the "live" media interface 128. Based on the available media content, the client interface 118 generates a list of available media content for transmission to consumers. For example, the client interface 118 may transmit a list of available media content to the CPE 114 via the NTU 112. The client interface 118 may receive requests for media content from the CPE 114 via the NTU 112. The client interface 118 also may receive requests for media content from the mobile device 108 via the wireless telecommunication system 106. In response, the client interface 118 transmits the requested media content to the CPE 114 and/or the mobile device 108 via the NTU 112 or the wireless telecommunication system 106, respectively. The client interface 118 may encrypt the media content and/or add copy-protection information to the media content.

Additionally, the client interface 118 receives consumer and device identification information from the CPE 114, the NTU 112, the computer 116, the mobile device 108, and/or the wireless telecommunication network 106. The client interface 118 transfers the consumer and device identification information to the billing interface 124 for authentication. The client interface 118 receives information from the billing interface 124 indicating whether the consumer and device are authorized to access requested media content. For example, the client interface 118 may receive a request for media content including a username/password, a phone number, and/or a device serial number. The client interface 118 extracts the username/password, the phone number, and/or the device serial number and transmits them to the billing interface 124 to determine whether the consumer and/or device associated with the consumer is authorized to access the media content. If the billing interface 124 indicates that the access is authorized, the client interface 124 allows the media content to be transmitted to the requesting device from either the media storage 122 via the stored media interface 120 or the media content creator/distributor via the "live" media interface 128. Alternatively, the billing interface 124 may instruct the client interface 118 to offer and/or grant a license for presentation of the media content to the device.

The stored media interface 120 stores media content received from media content creators/distributors in the media storage 122, retrieves the media content when a request is received via the client interface 118, and transmits the media content to requesting devices via the client interface 118. In the illustrated example, the stored media interface 120 is a standalone server. Alternatively, the stored media interface 120 may be integrated with the client interface 118, the billing interface 124, and/or the "live" media interface 128.

The media storage 122 stores retrievable media content for the stored media interface 120. The media storage 122 may be any type of storage device capable of storing media content such as, for example, any type of volatile memory, any type of non-volatile memory, a database, etc. The media storage 122 may be a standalone storage device or may be integrated with the stored media interface 120. The media content stored in the media storage 122 may be full resolution media content programs, reduced size media content programs (e.g., media content intended for use as picture-in-picture), programs specifically for display on mobile devices, clips of media content programs, and/or other media types.

The billing interface 124 determines whether a user and/or device is authorized to access media content in response to a request received via the client interface 118. The billing interface 124 may additionally determine whether a consumer and/or device are/is authorized to access subscriber data networks (e.g., the internet). To these ends, the billing interface 124 accesses billing records stored in the billing storage 126. For example, the billing interface 124 may receive a username/password associated with a consumer and/or a serial number associated with the CPE 114 along with a request to access media content (e.g., content associated with HBO). The billing interface 124 attempts to retrieve one or more billing records associated with the username/password and/or the serial number from the billing storage 126. If one or more billing records exist, the billing interface 124 determines if the one or more billing records indicate(s) that the requesting device is authorized to access the requested media content (e.g., the consumer subscribes to HBO and has paid their bills). If the billing interface 124 determines that one or more records indicate(s) that the consumer is authorized to access the requested media content, the billing interface 124 sends a message to the client interface 118 indicating that the consumer is authorized to access the media content.

The example billing storage 126 is an accounting database associating consumer and/or device identification information with media content subscription information. The example billing storage 126 may additionally store information associated with a user's data network access subscription (e.g., internet access subscription) and/or wireless network access subscription (e.g., cellular phone access subscription). In the illustrated example, the billing storage 126 is a standalone storage device. However, it will be understood by persons of ordinary skill in the alt that the billing storage 126 may alternatively be integrated with the billing interface 124.

The "live" media interface 128 is a media content interface that handles the acquisition of media content from media content creators/distributors and the distribution of the "live" media content to consumers via the client interface 118. The "live" media content may be received from media content creators/distributors and immediately, or nearly immediately, transmitted to consumers. In other words, the "live" media content may not be stored in the telecommunication network 104 (e.g., media content stored in the media content storage 122). Of course, "live" media content may be live action content (e.g., new casts, sporting events, etc.) or previously recorded events. For example, while a basketball game may be recorded and received by the "live" media interface 128 as the game is played, or near the time that the game is played, a game show may be recorded, stored by the media content creator/distributor, and transmitted to the "live" media interface 128 at a time much later than the time that the game show was recorded. The "live" media content may be full resolution media content programs, reduced size media content programs (e.g., media content intended for use as picture-in-picture), programs specifically for display on mobile devices, clips of media content programs, and/or other media content.

The example wireless telecommunication network 106 is a cellular telecommunication network. The example wireless telecommunication network 106 receives requests for media content and/or lists of available media content from the mobile device 108 (e.g., HTML formatted requests, XML formatted requests, etc.) and transmits the requests to the client interface 118. The wireless telecommunication network 106 of the illustrated example receives media content from the client interface 118 and transmits the media content to the requesting mobile device 108. The wireless telecommunication network may be any type of cellular telecommunication network such as, for example, a Code Division Multiple Access (CDMA) circuitry, Global System for Mobile Communication (GSM), General Packet Radio Service (GPRS) circuitry, universal mobile telecommunication system (UMTS) circuitry, etc. Alternatively, the wireless telecommunication network 106 may use any other type of wireless communications network and/or protocol such as, for example, Bluetooth communications, any variety of IEEE 802.11 protocol communications, etc.

The mobile device 108 of the illustrated example (e.g., a cellular telephone) is communicatively coupled to the wireless telecommunication network 106. The mobile device 108 generates requests for media content and/or lists of available media content and transmits them via the wireless telecommunication network 106 to the client interface 118. The mobile device of the illustrated example transmits information about the consumer using the mobile device (e.g., a username and/or password) and/or information about the mobile device (e.g., a serial number or network identifier) along with the request. In addition, the mobile device 108 receives media content and/or lists of available media content from the client interface 118 via the wireless telecommunication network 106. The mobile device 108 presents the received media content and/or lists of available media content using presentation circuitry (e.g., speakers and/or a display screen). For example, a consumer using the mobile device may request presentation of an HBO program. The mobile device sends the request along with a serial number associated with the mobile device to the client interface 118 via the wireless telecommunication network 106. After determining that the mobile device 108 is authorized to receive the HBO program, the media content is transmitted to the mobile device via the wireless telecommunication network 106. The mobile device 108 receives the HBO program and shows the video content on a display screen and plays the audio content over speakers or attached headphones. For example, the mobile device may include a software application for decrypting and presenting media content programs. Alternatively, a software application for decrypting and presenting media content may be provided on a server for the mobile device to download and install.

An alternative implementation of the example telecommunication system 100 of FIG. 1 is discussed below in connection with FIG. 4.

Figure 2:
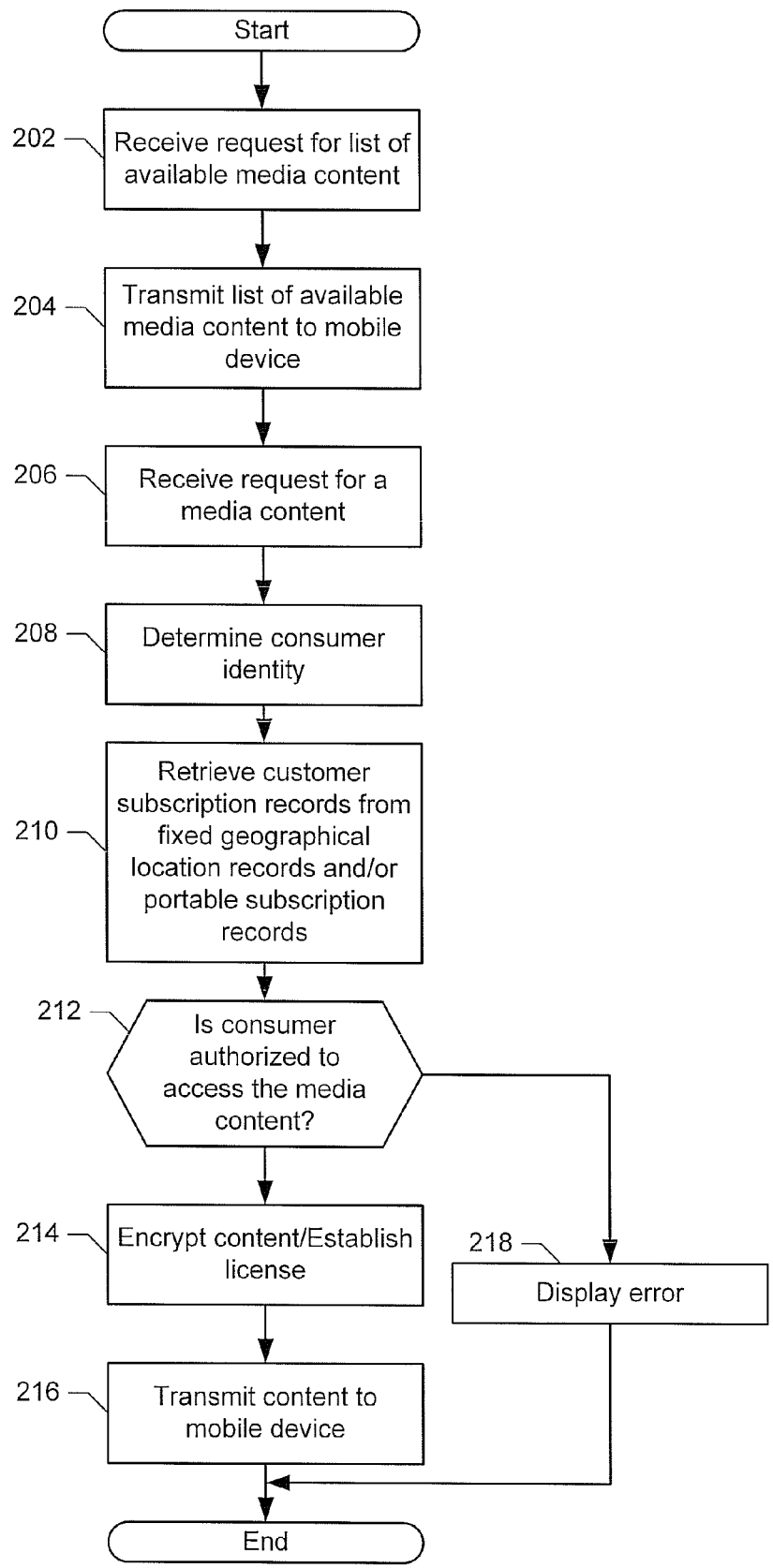
FIG. 2 is a flowchart representative of example machine readable instructions which may be executed to distribute media content.
Figure 3:
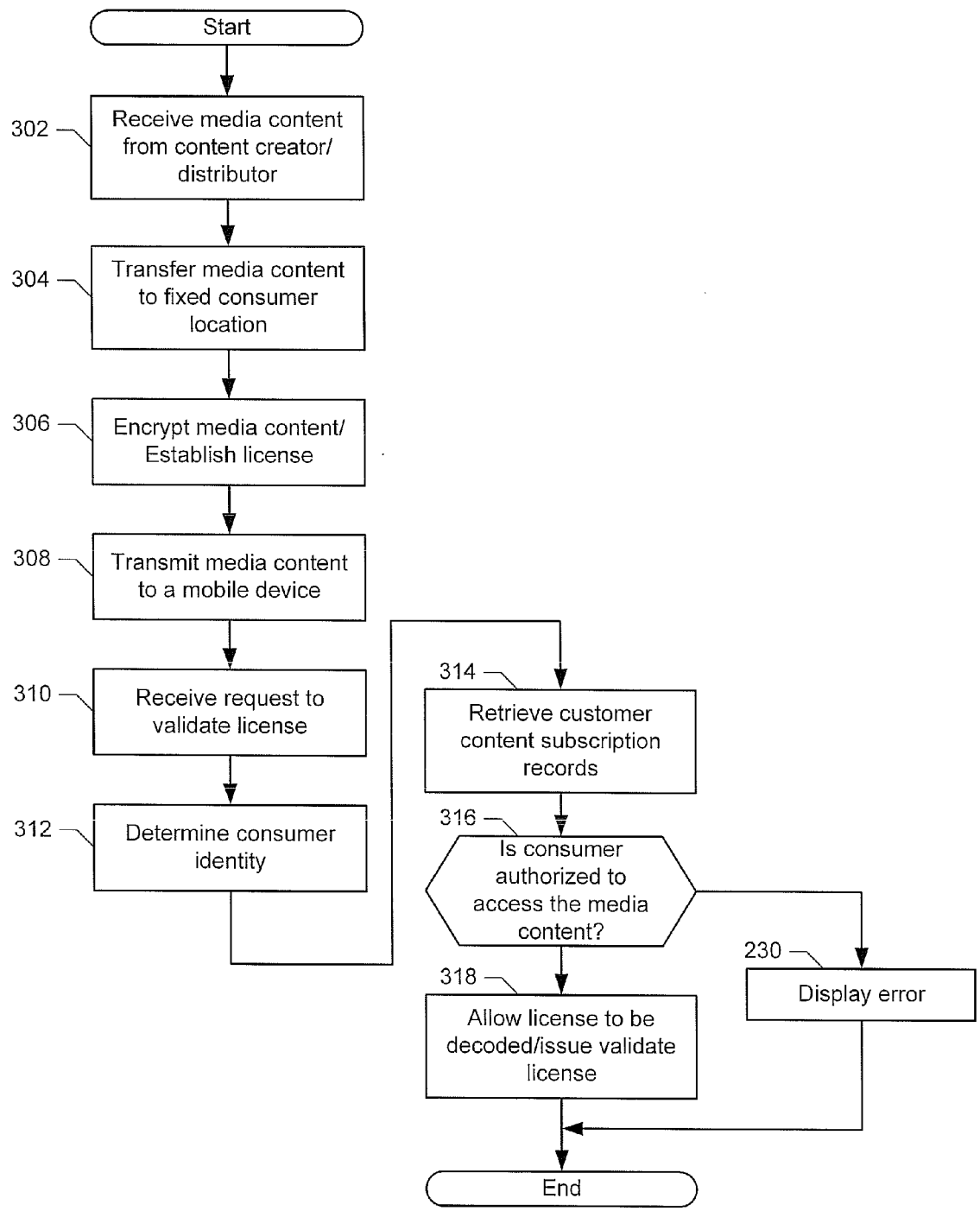
FIG. 3 is a flowchart representative of example machine readable instructions which may be executed to distribute media content.

Flowcharts representative of example machine readable instructions for implementing the telecommunication network 104 of FIG. 1 are shown in FIGS. 2-3. In this example, the machine readable instructions comprise a program for execution by a processor such as the processor 9012 shown in the example computer 9000 discussed below in connection with FIG. 5. The program may be embodied in software stored on a tangible medium such as a compact disc read-only memory (CD-ROM), a floppy disk, a hard drive, a digital versatile disk (DVD), or a memory associated with the processor 9012, but persons of ordinary skill in the art will readily appreciate that the entire program and/or parts thereof could alternatively be executed by a device other than the processor 9012 and/or embodied in firmware or dedicated hardware in a well known manner. For example, any or all of the client interface 118, the stored media interface 120, the billing interface 124, and/or the "live" media interface 128 could be implemented by software, hardware, and/or firmware. Further, although the example program is described with reference to the flowcharts illustrated in FIGS. 2-3, persons of ordinary skill in the art will readily appreciate that many other methods of implementing the telecommunication network 104 may alternatively be used. For example, the order of execution of the blocks may be changed, and/or some of the blocks described may be changed, eliminated, or combined.

FIG. 2 is a flowchart representative of example machine readable instruction which may be executed for distributing media content. In the example machine readable instructions of FIG. 2, media content is transmitted to mobile devices on demand. In other words, media content is not transmitted to mobile devices until the mobile device requests the media content.

The execution of the example machine readable instructions of FIG. 2 begins when the client interface 118 receives a request for a list of available media content from a receiving device (e.g., the computer 116 or the mobile device 108) (block 202). The client interface prepares a list of media content available via the stored media interface 120 and/or the "live" media interface 128 and transmits the list to the mobile device 180 (block 204). The client interface 118 then receives a request for media content from the mobile device 180 (block 206). For example, after reviewing the list of available media content, a consumer using the mobile device 108 may transmit a request to view desired media content. The request includes consumer identification information (e.g., a username/password) and/or device identification information (e.g., a serial number for the mobile device 180).

After receiving the request for media content, the client interface 118 transmits the request and the identification information to the billing interface 124. The billing interface 124 determines the identity of the consumer and/or device by comparing the receiving identification information with information stored in the billing storage 126 (block 208). The billing interface 124 then retrieves media content subscription information associated with the determined identity from the billing storage 126 (block 210). In one example, the subscription information is subscription records associated with a fixed geographical location. For example, the subscription records may be subscription records associated with a subscription to media content at a house. The example subscription records may be associated with a subscription to a premium content channel (e.g., the HBO channel). In another example, the subscription records may be associated with both a geographically fixed location and the mobile device 180.

Next, the billing interface 124 compares the requested media content to subscription information associated with a fixed geographical location (e.g., a home or a business) to determine if the requesting device is authorized to access the requested media content (block 212). If the consumer and/or the device are not authorized to access the media content, the billing interface 124 transmits a notification (e.g., an access denied error message) to the mobile device 180 via the client interface 118 and the NTU 112 or the wireless communication network 106 (block 218). If the consumer and/or device are authorized to access the media content because of their geographical based subscription (e.g., a subscription associated with a fixed geographical location), the billing interface informs the client interface 118 that the requesting consumer and/or device are authorized to access the media content. The client interface then encrypts and/or establishes a license for the media content (block 214). Then, the client interface 118 transmits the encrypted and/or licensed media content to the mobile device 180 (block 216).

FIG. 3 is a flowchart representative of example machine readable instruction which may be executed for distributing media content. In the example machine readable instructions of FIG. 3, media content is transmitted to receiving devices as it is received from media content creators/distributors. In other words, the media content is streamed to the receiving device from a media content creator/distributor. The receiving device may store the media content for later presentation or may present the media content as it is received. In the example process of FIG. 3, a consumer using the mobile device does not request that the media content is transmitted.

The execution of the example machine readable instructions of FIG. 3 begins when media content is received from a content creator/distributor via the "live" media interface 126 (block 302). The "live" media interface 128 transmits the media content to the CPE 114 via the client interface 118 and the NTU 112 (block 304). The CPE 114 may store the media content or present the media content on the television 110.

The client interface 118 then encrypts and/or licenses the media content (block 306). The media content is licensed to be played only on devices that are authorized to receive and present the media content. For example, the media content may be licensed for playback on the computer 116 and/or the mobile device 108. The client interface 118 then transmits the media content to the computer 116 via the NTU 112 and/or the mobile device 108 via the wireless telecommunication network 106 (block 308).

When the media content is received by the computer 116 and/or the mobile device 108, the computer 116 and/or the mobile device 108 will attempt to validate the license for playback by sending a request including identification information for the consumer and/or the device to the client interface 118. The client interface 118 receives the request to validate the license and transmits the request to the billing interface 124 to determine if the consumer and/or device are/is authorized to access the media content (block 310). The billing interface 124 determines the identity of the consumer and/or the device by comparing the received identification information to information stored in the billing storage 126 (block 312). The billing interface 124 then retrieves media content subscription information from the billing storage 126. The billing interface 124 compares the media content requested to billing records in the billing storage 126 to determine if the consumer and/or device are/is authorized to access the requested media content (block 316). If the consumer or device is not authorized to access the media content, the billing interface transmits an error to the device via the client interface 118 and the NTU 112 or the wireless telecommunication network 106 (block 320). Additionally, the computer 116 or the mobile device 108 may provide a way for the consumer to subscribe to the media content. If the consumer and device is authorized to access the media content, the billing interface 124 transmits a notification to the computer 116 and/or the mobile device 108 via the client interface 118 and the NTU 112 or the wireless telecommunication network 106 indicating that the media content may be presented (block 318).

Figure 4:
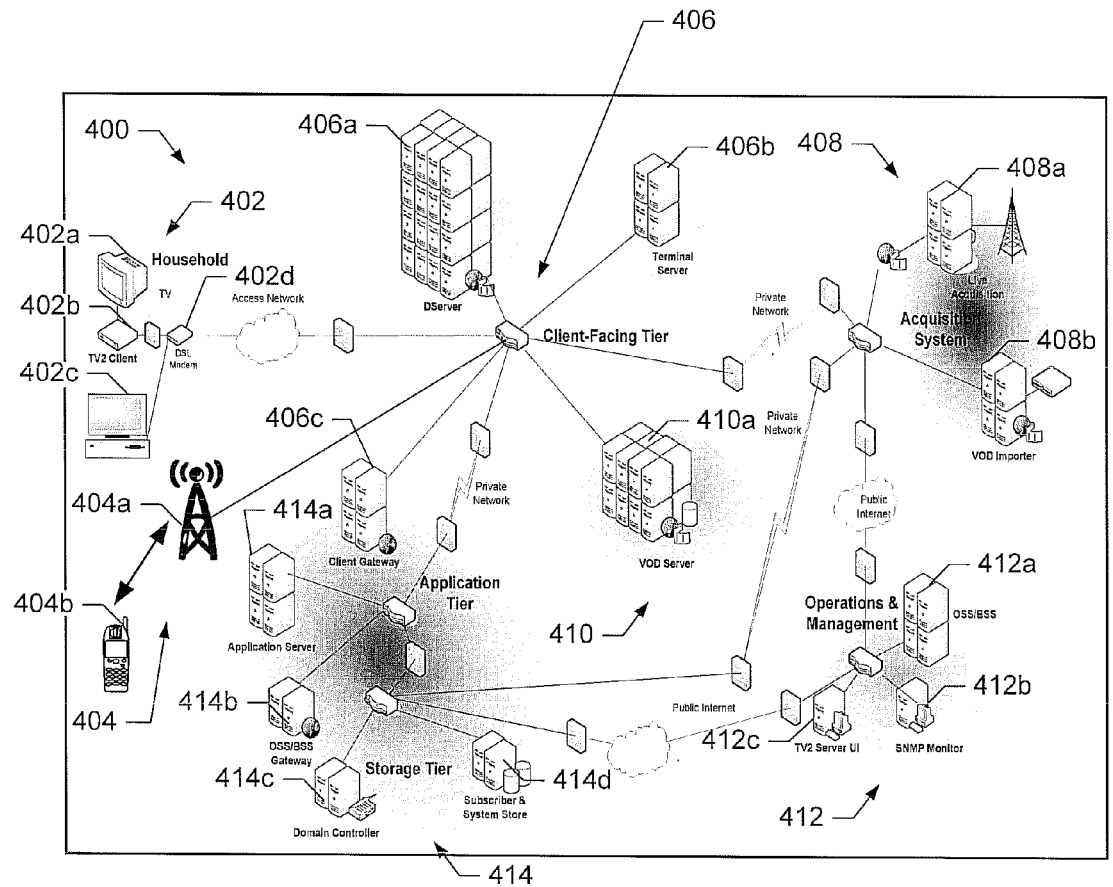
FIG. 4 illustrates an example telecommunication system for providing internet protocol television (IPTV) media content.

FIG. 4 illustrates an example telecommunication system 400 for providing IPTV media content. In general, the telecommunication system 400 includes a household 402, a wireless telecommunication system 404, a client facing tier 406, an acquisition system 408, a video on demand system 410, an operations and management system 412, and an application and storage tier 414.

In general, the telecommunication system 400 receives media content from media content creators/distributors via the acquisition system 408. The media content is transmitted to the client facing tier 406. In the client facing tier 406, the media content is either transmitted to the video on demand system 410 for storage or transmitted to the household 402 or the wireless telecommunication system 404. The application and storage tier 414 verifies that consumers connecting to the telecommunication system 400 are authorized to access media content and other services provided by the telecommunication system 400 (e.g., internet access, pay per view access, etc.) The application and storage tier 414 additionally transmits usage information (e.g., purchase of a pay per view movie) to the operations and management system 412. The operations and management system 412 provides an interface for the telecommunication system 400 for use by technicians. In addition, the operations and management system 412 tracks billing information associated with media content creators/distributors.

The household 402 is similar to the household 102 of FIG. 1. The household 402 includes a television 402a, a CPE 402b, a computer 402c, and a NTU 402d, which may be similar to the television 110, the CPE 114, the computer 116, and the NTU 112 of FIG. 1, respectively. The devices in the household 402 receive IPTV media content similar to the media content received by the household 102 of FIG. 1.

The wireless telecommunication system 404 is similar to the wireless telecommunication system 106 and the mobile device 108 of FIG. 1. The wireless telecommunication system 404 includes a cellular communications network 404a and a cellular telephone 404b, which may be similar to the wireless telecommunication system 106 and the mobile device 108 of FIG. 1, respectively.

The client facing tier 406 is similar to the client interface 118 of FIG. 1. The client facing tier 406 comprises a DServer 406a, a terminal server 406b, and a client gateway 406c. The DServer 406a temporarily stores media content as the media content is transmitted to the household 402 and/or the wireless telecommunication system 404. The terminal server 406b provides applications that may be executed remotely from the CPE 402b, the computer 402c, and/or the cellular telephone 404b. The client gateway 402c communicates with the CPE 402b and the computer 402c via the NTU 402d and the cellular telephone 404b via the cellular communications network 404a.

The acquisition system 408 comprises a live acquisition server 408a and a video on demand (VOD) importer 408b. The live acquisition server 408a acquires media content from media content creators/distributors, encodes media content, encrypts media content, and encapsulates media content for delivery to the household 402 and/or the wireless telecommunication network 404 via remote transmission protocols. The VOD importer 408b receives VOD content from media content creators/distributors and stores the media content on the VOD server 410a.

The operations and management system 412 comprises an operational support system/business support system (OSS/BSS) 412a, a simple network management protocol (SNMP) monitor 412b, and a TV2 management system 412c. The OSS/BSS 412a stores billing information associated with media content creators/distributors. The SNMP monitor 412b provides a user interface for technicians to access system errors and messages. The TV2 management system 412c provides management tools for technicians to configure the telecommunication system 400.

The application and storage tier 414 comprises an application server 414a, an OSS/BSS gateway 414b, a domain controller 414c, and a subscriber and system store 414d. The application server 414a provides user interface applications for the CPE 402b. For example, the application server 414a provides a user interface for access to video on demand media content. The OSS/BSS gateway 414b provides an interface between the operations and management system 412 and the application and storage tier 414. The domain controller 414c provides network services such as user authentication, current time announcement, etc. The subscriber and system store 414d stores information associated with consumer media content subscriptions and electronic program guide data. The subscriber and system store 414d may be similar to the billing storage 126 of FIG. 1.

Figure 5:
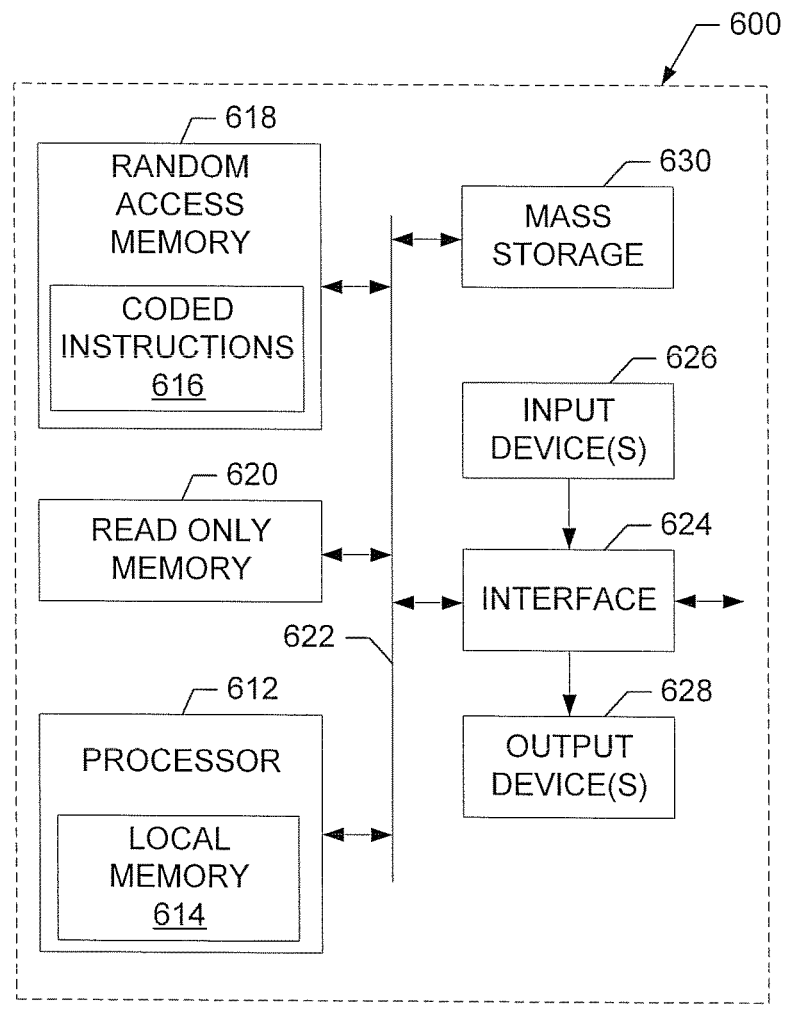
FIG. 5 is an example processor system that may execute the machine readable instructions represented by FIGS. 2 and/or 3 to implement the example methods and apparatus described herein.

FIG. 5 is a block diagram of an example computer 9000 capable of executing the machine readable instructions represented by FIGS. 2 and/or 3 to implement the apparatus and/or methods disclosed herein. The computer 9000 can be, for example, the NTU 112, the CPE 114, the computer 116, or the telecommunication network 104 and/or any part thereof.

The system 9000 of the instant example includes a processor 9012 such as a general purpose programmable processor. The processor 9012 includes a local memory 9014, and executes coded instructions 9016 present in the local memory 9014 and/or in another memory device. The processor 9012 may execute, among other things, the machine readable instructions illustrated in FIGS. 2 and 3. The processor 9012 may be any type of processing unit, such as a microprocessor from the Intel® Centino® family of microprocessors, the Intel® Pentium® family of microprocessors, the Intel® Itanium® family of microprocessors, and/or the Intel XScale® family of processors. Of course, other processors from other families are also appropriate.

The processor 9012 is in communication with a main memory including a volatile memory 9018 and a non-volatile memory 9020 via a bus 9022. The volatile memory 9018 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 9020 may be implemented by flash memory and/or any other desired type of memory device. Access to the main memory 9018, 9020 is typically controlled by a memory controller (not shown) in a conventional manner.

The computer 9000 also includes a conventional interface circuit 9024. The interface circuit 9024 may be implemented by any type of well known interface standard, such as an Ethernet interface, a universal serial bus (USB), and/or a third generation input/output (3GIO) interface.

One or more input devices 9026 are connected to the interface circuit 9024F. The input device(s) 9026 permit a user to enter data and commands into the processor 9012. The input device(s) can be implemented by, for example, a keyboard, a mouse, a touchscreen, a track-pad, a trackball, isopoint and/or a voice recognition system.

One or more output devices 9028 are also connected to the interface circuit 9024. The output devices 9028 can be implemented, for example, by display devices (e.g., a liquid crystal display, a cathode ray tube display (CRT), a printer and/or speakers). The interface circuit 9024, thus, typically includes a graphics driver card.

The interface circuit 9024 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 9000 also includes one or more mass storage devices 9030 for stoning software and data. Examples of such mass storage devices 9030 include floppy disk drives, hard drive disks, compact disk drives and digital versatile disk (DVD) drives.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or victual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

Although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to distribute media comprising:
    storing a first record associating a telephone number of a cellular communication device with a wired network termination unit;
    transmitting media to the cellular communication device via a cellular communication path, the media transmitted in an encrypted format;
    receiving a request for authorization to present the transmitted media from the cellular communication device via the cellular communication path; and
    in response to the request for authorization:
        determining the telephone number of the cellular communication device originating the request;
        identifying a billing record associated with the wired network termination unit by comparing, using the first record, the telephone number to a plurality of billing records associated with respective ones of a plurality of wired network termination units, wherein the particular piece of media does not include the billing records, and the wired network termination unit is to communicatively couple a customer device to a service provider's telecommunication system via a wired communication path;
        determining that the identified billing record authorizes the wired network termination unit to receive the particular piece of media via the wired communication path; and
        in response to determining that the identified billing record authorizes the wired network termination unit to receive the particular piece of media via the wired communication path, establishing a license authorizing the cellular communication device to decrypt and present the media.

2. The method as defined in claim 1, further including:
    receiving a request for a list of available media; and
    in response to the request for the list of available media, transmitting the list of available media to the cellular communication device.

3. The method as defined in claim 1, further including encrypting the particular piece of media prior to transmitting the media to the cellular communication device.

4. The method as defined in claim 1, wherein the establishing of the license for the particular piece of media occurs prior to transmitting the media to the cellular communication device.

5. The method as defined in claim 1, wherein the particular piece of media has a different format when transmitted to the wired network termination unit than when transmitted to the cellular communication device.

6. The method as defined in claim 1, further including transmitting a notification to the cellular communication device if the cellular communication device is not authorized to receive the particular piece of media.

7. The method as defined in claim 1, wherein the particular piece of media is Internet protocol television media.

8. The method as defined in claim 1, wherein the wired network termination unit is at least one of a cable modem, a satellite receiver, an optical network terminal unit, or a digital subscriber line modem.

9. The method as defined in claim 1, wherein the cellular communication device is at least one of a cellular telephone, a smartphone, a portable device or a handheld device.

10. The method as defined in claim 1, wherein the cellular communication device is transported from a first location to a second location by a consumer.

11. The method as defined in claim 1, wherein the establishing of the license for the particular piece of media occurs after transmitting the media to the cellular communication device.

12. An apparatus comprising:
- a media interface to transmit media to a wired network termination unit via a wired communication path of a service provider's network, and to transmit the media to a cellular communication device via a cellular communication path, the media transmitted in an encrypted format;
- a client interface to receive a request from the cellular communication device for authorization to present the transmitted media, the request received via the cellular communication path;
- a billing record database to store a first record associating a telephone number of the cellular communication device with the wired network termination unit; and
- a billing interface to, in response to the request for authorization:
  - query the billing record database based on the telephone number of the cellular communication device to identify, using the first record, a billing record associated with the wired network termination unit;
  - determine that the billing record authorizes the wired network termination unit to receive the media via the wired communication path; and
  - in response to determining that the billing record authorizes the wired network termination unit to receive the media via the wired communication path, authorize the cellular communication device to decrypt and present the transmitted media, wherein at least one of the client interface, the media interface or the billing interface is implemented using hardware, and wherein the media does not include the billing record.

13. The apparatus as defined in claim 12, wherein the media interface includes a video on demand server.

14. The apparatus as defined in claim 12, further including a media storage to store the media.

15. The apparatus as defined in claim 12, wherein the media interface is to receive the media from at least one of a media creator or a media distributor.

16. The apparatus as defined in claim 12, further including a cellular telecommunication system to transmit the media to the cellular communication device.

17. The apparatus as defined in claim 12, wherein the media is Internet protocol television media.

18. The apparatus as defined in claim 12, wherein the wired network termination unit is at least one of a cable modem, a satellite receiver, an optical network terminal unit, or a digital subscriber line modem.

19. The apparatus as defined in claim 12, wherein the client interface includes at least one of a terminal server, or a client gateway.

20. The apparatus as defined in claim 12, wherein the billing interface includes at least one of an application server, an operational support system/business support system gateway, a domain controller, a subscriber and system store, an operational support system/business support system, or a simple network management protocol monitor.

21. The apparatus as defined in claim 12, wherein the media interface includes at least one of a live acquisition server or a video on demand importer.

22. A tangible computer readable memory comprising instructions that, when executed, cause a machine to at least:
- transmit media to the cellular communication device via a cellular communication path, the media transmitted in an encrypted format;
- receive a request for authorization to present the transmitted media from the cellular communication device via the cellular communication path, the cellular communication device not communicatively coupled to a wired network termination unit, the wired network termination unit to communicatively couple a customer device to a service provider's telecommunication system via a wired communication path; and
- in response to the request for authorization:
  - determine a telephone number of the cellular communication device originating the request;
  - identify the wired network termination unit by comparing, using a first record associating the telephone number of the cellular communication device with the wired network termination unit, the telephone number to a plurality of billing records associated with respective ones of a plurality of wired network termination units, wherein the media does not include the billing records;
  - make a determination of that an identified billing record authorizes the wired network termination unit to receive the media via the wired communication path; and
  - in response to determining that the identified billing record authorizes the wired network termination unit to receive the media via the wired communication path, establish a license authorizing the cellular communication device to decrypt and present the media.

* * * * *